April 26, 1938.     W. S. GRAHAM ET AL     2,115,387
TRACTOR ATTACHING BRACKET
Filed June 19, 1937     2 Sheets-Sheet 2

Inventor
William S. Graham
and Hiram P. Smith.
By I. F. Lavagne
Att'y.

Patented Apr. 26, 1938

2,115,387

UNITED STATES PATENT OFFICE 2,115,387

TRACTOR ATTACHING BRACKET

William S. Graham and Hiram P. Smith, Canton, Ill., assignors to International Harvester Company, a corporation of New Jersey Application June 19, 1937, Serial No. 149,072

12 Claims. (Cl. 97—47)

This invention relates to farm implements of the direct connected type and particularly to attaching brackets for connecting a cultivator of the type which is adapted to be swung across the front of the tractor incidental to movement of the steering mechanism.

The principal object of this invention is to provide an attaching bracket for the pendulum, swing type cultivator when attached to a tractor of the tricycle type that will support the cultivator within the confines of the forward end of the tractor, so that visibility of the plant rows by the operator is enhanced.

It is another object of this invention to provide a bracket for pendulum swing type cultivators, which may be readily attached to or detached from the tractor, and to which the cultivator swinging arms may be easily attached when the tractor is moved into alignment therewith for attachment to the cultivator.

In general, this invention resides in an attaching bracket assembly adapted for connecting an attachment to the usual attaching bracket plates carried by the tractor and comprising two vertical bracket support members which are braced to the tractor bolster and which are so spaced in front of the tractor as not to lie generally within the view of the operator of the tractor; also, bracing means for fixing the upper ends of these vertical support members, and the support members having means at their upper ends for attaching swinging arms, which support the cultivator.

The cultivator comprises, in general, a transverse pipe frame which carries straddle-row cultivator gang implements adapted to be supported by the swinging arms when the same are attached to the present bracket support. The transverse supporting member is connected by connecting links and levers to a vertical steering shaft and is swung to the right or left by the operator in response to movement of the steering wheel.

For other objects and for a clearer understanding of the invention, reference may be had to the following description taken with the accompanying drawings, in which.

Figure 1:
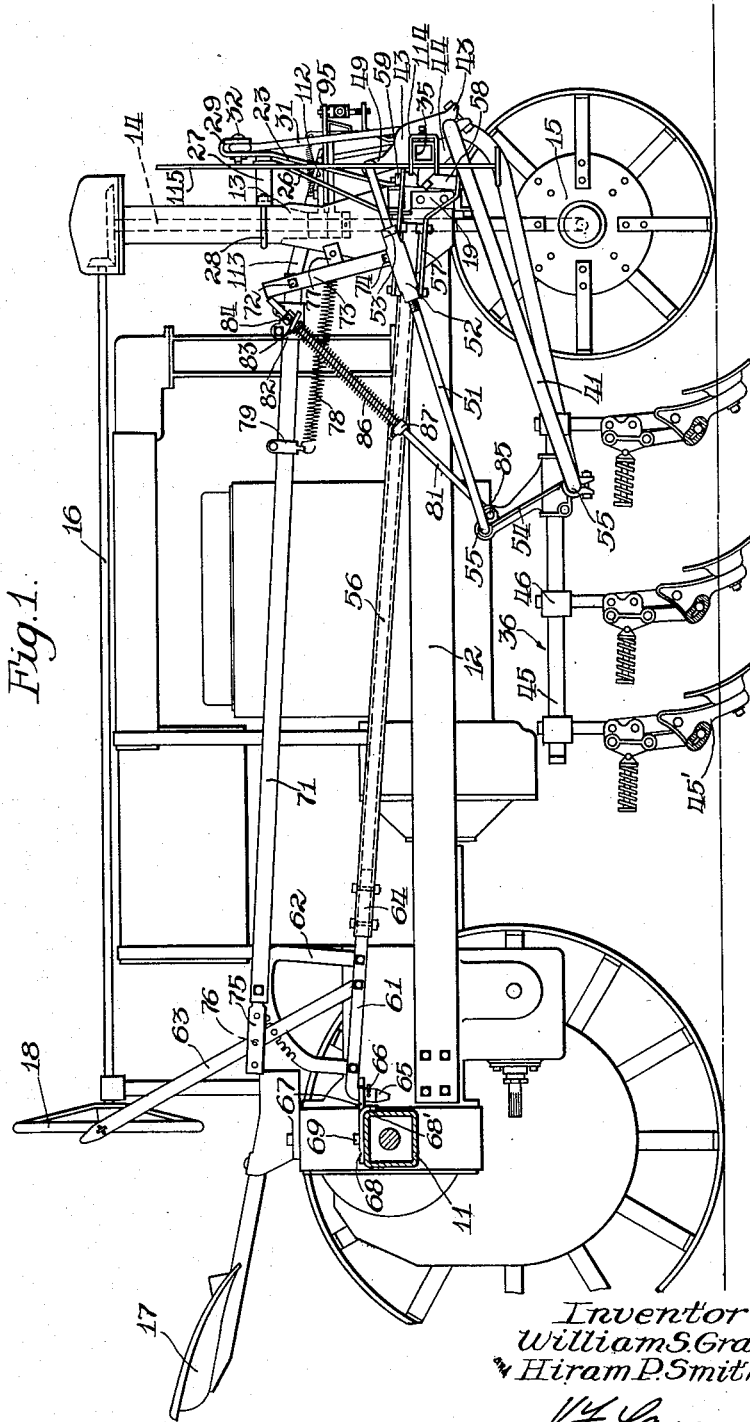
Figure 1 is a side elevational view of a tractor of the tricycle type having one of its rear wheels removed and to which the cultivator is attached by means of an attaching bracket assembly of the present invention.
Figure 2:
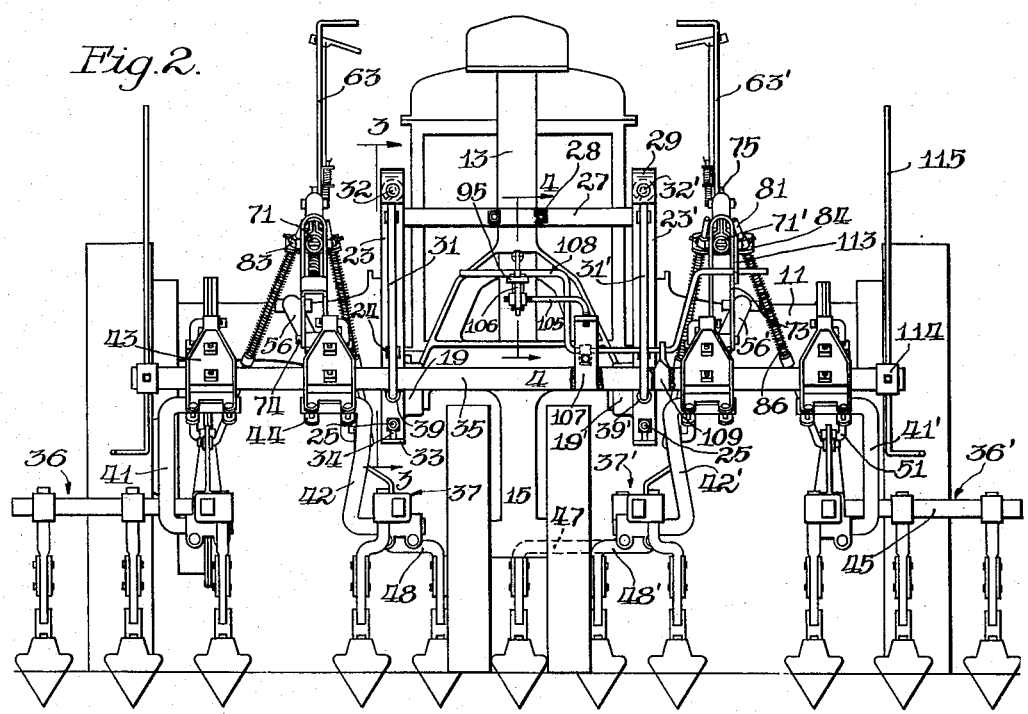
Figure 2 is a front elevational view of the tractor, cultivator, and also of the attaching bracket.
Figure 3:
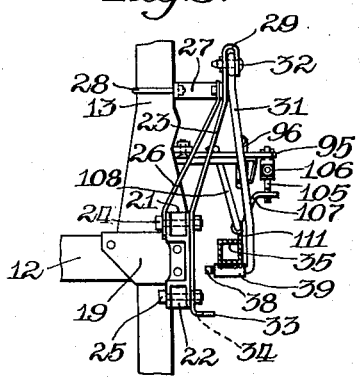
Figure 3 is a side elevational view taken on the line 3—3 of Figure 2, showing in detail the bracket assembly; and, Figure 4 is an elevational view taken on the line 4—4 of Figure 2 of the shifting lever mechanism on the steering shaft.

In Figures 1 and 2 there is shown a tractor of the tricycle type having a rear axle housing 11 and side sills 12 spaced at the forward end by a tractor bolster 13, through which a steering shaft 14 passes to the front wheel steering truck 15. Connected to the upper ends of the steering shaft 14 by means of gearing is a steering rod 16 running rearwardly and longitudinally of the axis of the tractor to a point near the operator's station 17, and having on the end thereof a steering wheel 18.

On the forward end of the tractor sills are secured the usual bracket plates 19 and 19', having upper slots 21 and lower slots 22 adapted to receive attaching bolts of the bracket assembly to be presently described.

The separable hang bracket assembly, in which the present invention resides, consists of two vertical, forwardly bent attaching bracket support members 23 and 23', each of which has in its lower end portion bolt clamps 24 and 25, which are adapted to be disposed in the aforementioned slots 21 and 22 of the tractor bracket plate for attachment of the same to the tractor. The upper bolt clamps are adapted to include a vertically extending brace 26 in rear of the vertical support members 23 and 23' and adapted to be attached to the same at a point near the upper end for the purpose of bracing the vertical support at that point. For further bracing of the vertical support members 23 and 23' there is a tie brace member 27 adapted to connect the upper ends of the vertical supports at the same point that the braces 26 connect with the supports, and tied to the tractor bolster 14 by means of a U-bolt 28. This provides adequate bracing for the bracket assembly when once it is attached to the tractor.

The upper ends of the vertical supports 23 have a portion thereof turned down to provide an inverted U 29 adapted to receive the ends of vertically extending swinging arms 31 and 31' and connecting pins 32 and 32' therefor, and at the lower end it is turned forwardly at 33, having a slot 34 for retaining the bolt 25 prior to swinging the same up into the tractor bracket slot 22 when connecting the bracket assembly to the tractor. It will be obvious that a quick attachment of the bracket assembly is to be effected in the bracket assembly of the present invention.

The cultivator consists generally of a main transverse pipe bar 35, which extends across the front of the tractor to points removed from the side sills and from the vertical supports 23 attached to the sills. This bar is the main support bar for outside cultivator gangs 36 and 36' and inside cultivator gangs 37 and 37', and the same is adapted to be hung from the vertical supports 23 and 23' by the swinging arms 31 and 31' attached to the same by means of the pins 32 and 32'. The swinging arms 31 and 31' are adapted to engage the transverse bar by means of their rearwardly turned portions 38 extending through sleeve members 39 and 39' welded or secured to the under surface of the transverse bar. In view of the weight carried by the transverse bar, this means of connecting the swinging arms 31 and 31' to the transverse support eliminates the placing of the downward strain of the swinging arms on a single cotter pin or thread connection that might have been used. Further, the arrangement of these swinging arms down over the front of the transverse bar 35 permits the transverse bar to be located nearer to the front end of the tractor, as is desirable in directly connected types of implements.

The cultivator gangs are attached for pivotal movement to the transverse support 35 by drag beams 41 and 41' for the outside gangs and 42 and 42' for the inside gangs to gang beam hangers 43 fixed to the transverse support by hanger clamps 44. These gang beam hangers 43 may be set at any position along the transverse support bar, depending upon the row spacings of the crop to be cultivated. The cultivator gangs further consist of tool bars 45 and of ground-engaging tools, such as spring tripped shovels 45' of the usual type attached thereto by means of standard brackets 46. Offset arms, such as shown at 47, permit a spring tripped shovel to be located in rear of the steering truck, and offset arms 48 and 48' on the inside gangs are spaced to points behind the steering truck wheels. The usual standard brackets 46 may be loosened to permit the offset arms 47, 48, and 48' to be rotated away from the rear of the steering truck to permit removal of the tractor steering wheels upon detaching the cultivator from the tractor and then swung into position behind the steering truck when making attachment of the tractor with the cultivator.

The gang beam hanger 43 also has means 49 for pivotally attaching a parallel link 51, having a turnbuckle 52 and a clamping nut 53 and pivotally connected at its trailing end to a tool bar bracket 54, as at 55. The tool bar bracket 54 also has the gang beam 41 pivoted to it. This arrangement provides a parallel or simultaneous lift of the cultivator shovels from the ground.

In order to maintain the transverse support and cultivator gangs spaced from the forward end of the tractor, there is provided push pipes 56 and 56' having connecting means 57 fixed on their forward ends adapted to be attached to the transverse bar 35 by means of sleeves 58 (Figure 1) welded to the rear face of the transverse bar 35 and adapted to contain an attaching bolt 59 for the push pipe connection 57. To the rear end of the push pipe 56 there is attached a push pipe connection 61, which carries a quadrant 62 and a lift lever 63 by a telescoping connection 64 with the push pipe 56. The rear end of the push pipe connection 61 is turned down, as indicated at 65, to be retained by means of a cotter-pin 66 in a hole 67 of a push pipe plate 68, fixed to the rear axle housing 11 of the tractor by means of a cap screw 69. In order to remove shearing stress of the push bar plate from the cap screw 69, a downwardly extending portion 69' is provided to fit over the front face of the rear axle housing.

The lifting means for the cultivator gangs comprise right and left lift pipes 71 and 71', which are spaced above and parallel with the push pipes 56 and 56', and their forward ends connected at 72 to a lift lever rocker arm 73 pivotally connected at 74 to the push pipe front end connecting means 57. The rear ends of the lift pipe 71 and 71' have lift pipe lugs 75 fixed therein to which the lift lever 63 is connected, as at 76, in the lift pipe plug. The lift lever rocker arm 73 has a projection 77 for connecting a helper spring 78 thereto, which is in turn connected to the lift pipe 71, as indicated at 79. This spring is to assist during the lifting movement of the lifting lever to a forward portion on the quadrant 62. The actual lifting is accomplished by means of lift rods 81, one of such rods being provided for each of the cultivator gangs and attached to the lift pipe by means of a clamp member 82 fixed to the lift pipe 71 and having lifting lug or ear portions 83, through which the lift rods pass, and are held for the lifting operation by collars 84, the lift rods being attached at their lower ends to the tool bar clamps 54, as indicated at 85. It is obvious that the rods may slide with respect to the ear portions 84 in one direction, but are held by the ear portions during the lifting operation of the cultivator gangs. In order to apply pressure on the cultivator gangs during the cultivating operation, pressure springs 86 are provided on the lift rods 81, which may be adjusted as to the amount of pressure by means of set collars 87. From this description, it should be seen that any longitudinal movement of the lift pipes 71 and 71' by their respective lift levers 63 and 63' will effect a rocking movement of the lift lever rocker arm 73 about its pivot 74 on the push pipe, causing the lifting of the lift rods 81 by means of the lifting ear portions 82, all of which is assisted by the helper spring 78. The tractor gangs may thus be raised out of engagement with the ground and completely carried by the tractor.

The description thus far shows the cultivator and its transverse bar completely mounted on the tractor and adapted for raising and lowering of the cultivator gangs. The particular means for controlling the transverse movement of the transverse bar with relation to movement of the steering wheel will now be described.

Figure 4:
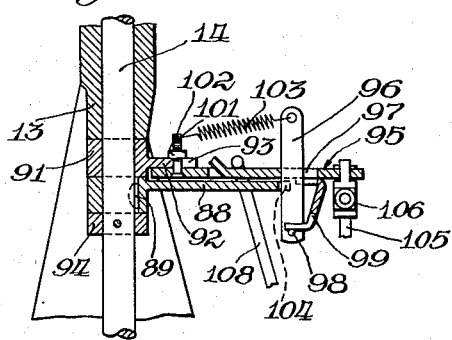

As best shown in Figure 4, there is provided a shift arm 88 fixed to the steering shaft 14 by means of a spline 89 and adapted to swing therewith. Journaled to the shaft 14 about the shift arm 88 is an axle spacer 91 having a projecting portion 92 with a slot 93 in the end thereof. A collar 94 fixed to the shaft 14 supports the shift lever 88 and the axle spacer 91 on the shaft.

Between the shifting lever 88 and the arm 92 of the axle spacer 91, there is slid a shift latch 95 having pivoted thereon a latch element 96 within a slot 97 and pivoted to a pin 98 fixed on a depending bracket 99 and permitting rotation of the latch 96 on the pin 98. The rear end of the shifting latch member 95 has an upstanding bolt 101 adapted to fit in the slot 93 of the axle spacer 91 and fixed thereto by means of a nut 102. The upper end of the latch element 96 has a spring 103 attached thereto and connected with the upper end of the bolt 101 to resiliently hold the latch element 96 against the forward end of the slot 97 and in a slot 104 in the end of the shift lever 88. When the latch element 96 is so disposed in the slot 104 of the shifting lever 88, there is a driving engagement of the steering shaft with the latch mechanism 95.

The outer end of the latch mechanism is connected to the transverse support member by means of a shifting lever link 105 (Figure 2) that is attached to the shifting lever through an I-bolt 106 and to a projection 107 on the transverse bar 35. It will now be seen that any movement of the steering mechanism will cause a swing of the cultivator to the right or to the left, as may be desired by the operator of the implement.

In order to disengage the connection of the steering mechanism with the cultivator supporting bar upon lifting the cultivator gangs out of the ground to a transport position, there is provided a throw-out rocker arm 108 supported on the transverse bar 35 by means of a throw-out support bearing 109 and a bearing 111 on the projection 107 which is detachable therefrom to permit removal of the throw-out rocker arm from the transverse support bearing 109. The throw-out rocker arm 108 is placed in position by feeding it through the bearing support 109 and then attaching the same in the bearing support 111 on the projection 107. The bar 108 has portions spaced from the bar to fit behind the latch 96 of the throw-out mechanism 95 and a slot 112 of a throw-out bar 113 pivoted to one of the lift lever rocker arms 73 (Figure 1). It should be understood that any movement of the lift lever mechanism will cause the throw-out bar to operate the latch 96 to disengage the same from slot 104 of the shift lever arm 88, and that as long as the cultivator tools are in ground engaging position, the latch 96 will remain connected to the shift arm 88.

It should now be apparent from the above description and from the showing in the drawings that there has been provided a bracket for the support of the cultivator of the pendulum swing type adapted to be operated by the steering mechanism, that is of simple construction and within the confines of the front end of the tractor wherein the forward visibility of the operator is not impaired. Also, a construction has been provided which permits easy attachment or detachment of the cultivator to and from the tractor. To detach the cultivator from the tractor, the cultivator gangs are first lowered to the ground. Front stand clamps 114 are loosened to permit lowering of the front stands 115 to the ground where they are again clamped to provide for a front end support of the cultivator. The offset arms 47, 48 and 48' are loosened from the tool bars to permit rearward rotation of the cultivator tools and allow clearance for the steering truck. Next, the cotter-pin 66 of the push pipe connection 61 is removed and the push pipe is lifted out of the holes 67 of the push pipe plate 68 and rested on some sort of convenient support means. The nut 106 of the bolt 101 is now loosened, thereby disconnecting the latch mechanism 95 from the axle spacer. The swinging arm connections 32 and 32' on the vertical bracket supports are disconnected and the tractor may now be backed out of the cultivator apparatus. It will thus be apparent that, by carrying on these operations in the reverse manner, the apparatus may be accordingly attached to the tractor.

The attaching bracket of the present invention and push pipe plate 88 may be left on the tractor or readily detached, if they should interfere with the mounting or work of some other implement to be used. By leaving the bracket assembly attached to the tractor, one step in the operation of attaching pendulum type cultivators to the tractor is eliminated. The bracket is left intact and does not carry the swinging arms, since they remain on the cultivator apparatus.

It shall be understood that the present invention herein described is obviously capable of certain modifications without departure from the spirit and scope of the appended claims.

What is claimed is:

1. In combination with a tractor having bracket plates and tractor structure between the bracket plates, an implement, a separable attaching bracket for mounting the implement on the tractor comprising vertical supporting members adapted for quick attachment to the tractor bracket plates, a tie brace for securing each of the vertical members to the intermediate tractor structure, and the vertical supporting members having means for pivotally attaching the implement to their upper ends and permitting transverse swing of the implements on the tractor.

2. In combination with a tractor having forward bracket plates and a steering head, an implement, separable attaching bracket assembly for mounting the implement on the tractor comprising vertical supporting members adapted for quick attachment to the tractor brackets, a tie brace for connecting each of the vertical members to the steering head, and means for pivotally attaching the implement to said vertical support members.

3. In combination with a tractor having bracket plates, an implement, a separable attaching bracket assembly for supporting said implement comprising two vertical support members having means at one of the ends of each member adapted for quick attachment to the tractor brackets, means for bracing said members at the other ends of the members to the tractor, and means for pivotally attaching the implement to the vertical members.

4. In combination with a tractor having bracket plates, an implement, a separable attaching bracket assembly comprising two vertically and forwardly extending members having lower and upper end portions, means adapted for quick attachment to the tractor bracket plates carried by the lower ends of the vertical members, brace members for fixing the vertical members to the tractor near their upper ends, and means for supporting the implement from the upper ends.

5. In combination with a tractor having attaching bracket plates, an implement having vertical swinging arms, a separable attaching bracket assembly comprising two vertically extending members having lower and upper end portions, means adapted for quick attachment to the tractor brackets on the lower ends of the vertical members, means for bracing the members near their upper ends, and said upper end portions being fashioned to receive the ends of said swinging arms of the implement for supporting the same operatively connected to the tractor.

6. In combination with a tractor having brackets, an implement having vertical swinging arms, a separable attaching bracket assembly comprising two vertically extending members having lower and upper end portions, means adapted for quick attachment to the tractor brackets on the lower ends of the vertical members, means for bracing the members near their upper ends, and the upper end portions of the vertical members being turned over to form an inverted U in which said swinging arms for supporting the implement are fastened.

7. In combination with a tractor having attaching bracket plates of the type in which there are open slots in the top and bottom thereof, an implement, a separable attaching bracket assembly for the implement comprising vertically extending bracket members having lower and upper end portions, means for fixing the lower end portion of each of the vertical members to the tractor, bracket plates including clamping bolts carried by vertical bracket members and adapted to lie in said tractor bracket slots, and bracing means for the vertical bracket fastened to the tractor bracket by said clamping bolts and extending to the upper end portion of the bracket member and fixed thereto, and means for attaching said implement to the upper ends of the vertical members.

8. In combination with a tractor having attaching bracket plates of the type in which there are open slots in projecting portions thereof and tractor structure intermediate the brackets, an implement, an attaching bracket for supporting the implement comprising vertical bracket supporting members having lower and upper end portions, means for fixing the lower end portions of each of the vertical members to the tractor bracket including clamping bolts carried by the vertical bracket members and adapted to lie in the tractor bracket slots, side bracing means for each of the vertical bracket members fastened to the tractor bracket by one of said clamping bolts and extending to the upper end portion of the bracket member and fixed at a point near its upper end, a tie brace means connecting the vertical members near their upper ends and attached intermediate thereof to said intermediate tractor structure, and means formed in the upper ends of the vertical members for pivotally attaching said implement.

9. In combination with a tractor having an attaching bracket, an implement including a transverse tool supporting bar, ground engaging tools mounted on said bar, and means for attaching said bar and tool to said attaching bracket for swinging movement relative thereto including vertically extending swinging arms pivotally attached to the bracket and pivotally attached to the tool support bar, said swinging arms in their attachment to the transverse bar extending downwardly and having their attaching portion bent to extend longitudinally of the tractor axis, and said bar having hole portions adapted to receive the longitudinally extending portion of the swinging arms.

10. In combination with a tractor having an attaching bracket, an implement including a transverse tool supporting bar, ground engaging tools mounted on said bar, and means for attaching said bar and tools to said attaching brackets for vertical swinging movement relative thereto including vertically extending swinging arms pivotally attached to the bracket and pivotally attached to the tool support bar, said swinging arms in their attachment to the tool bar extending downwardly in front of the tool bar and underneath the bar to partially surround the same and to contain it within the front of the bracket and the swinging arms, the bar being pivotally carried by underneath portions of the swinging arms.

11. In combination with a tractor of the tricycle type having a narrow forward end structure with attaching bracket plates thereon, an implement structure of the pendulum swing type adapted to be mounted across the forward end structure and to extend laterally beyond the confines of the forward tractor structure, and an attaching bracket for swingingly supporting the implement on the front end tractor structure so constructed as to be within the confines of the front end structure and out of the line of vision of the operator of the tractor.

12. In combination with a tractor of the tricycle type having narrowly spaced side sills with bracket plates on the front ends thereof and a relatively narrow tractor bolster structure spacing the front of the side sills, a cultivator structure of the pendulum type having swing arms and ground engaging tools extending laterally of the side sills and an attaching hang bracket assembly for connecting the cultivator to the tractor comprising two vertically extending supporting members having lower and upper end portions, means on the lower end portion adapted for quick attachment to the tractor bracket plates, means for bracing the upper end portions by connection with the tractor bolster structure and retaining them within the space between the side sills, and means on the upper end portions of the vertical supporting members for pivotally attaching the cultivator swinging arms to operatively connect the cultivator to the tractor directly in front of the end of the side sills and tractor bolster structure.

WILLIAM S. GRAHAM.
HIRAM P. SMITH.